Figure 1:
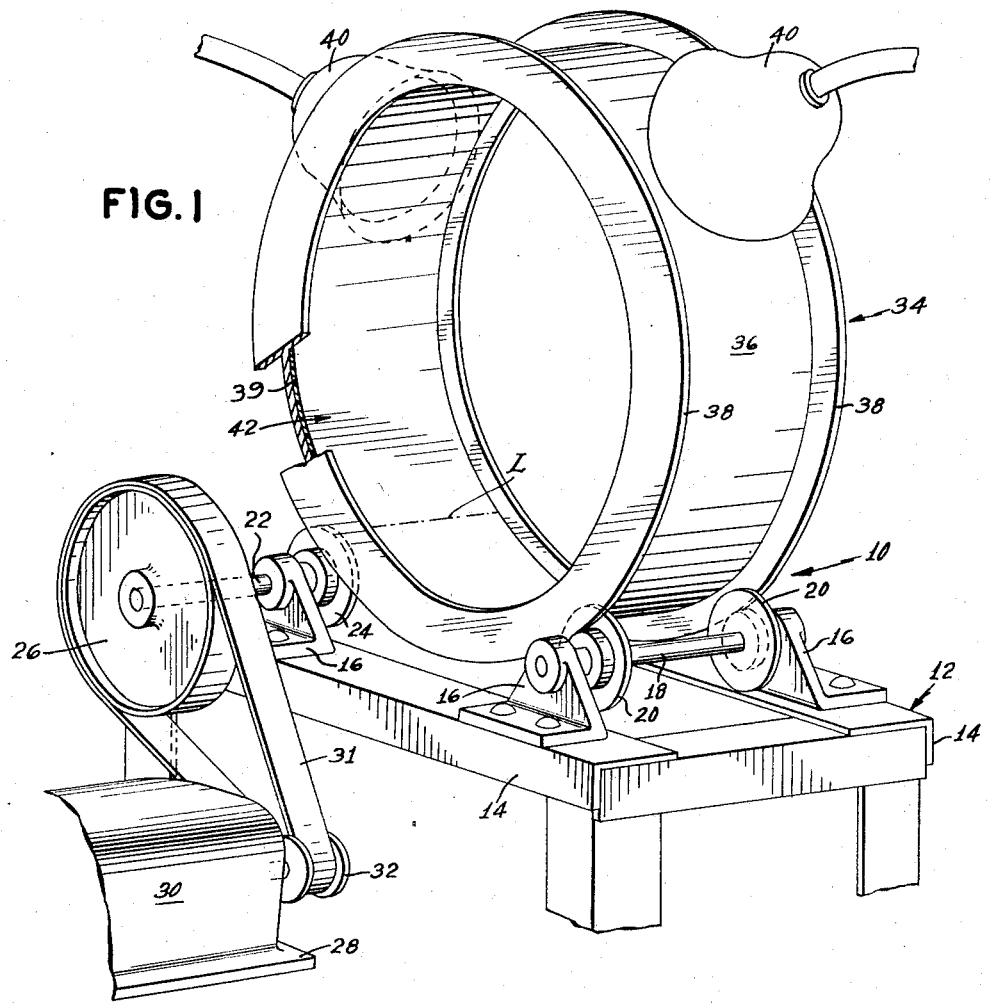

Oct. 21, 1958      E. GERSON ET AL      2,856,635
METHOD OF MANUFACTURING PLASTIC SHEET MATERIAL
WITH PEARL ESSENCE INCORPORATED THEREIN
Filed Aug. 24, 1954

INVENTORS
Edward Gerson
Paul F. Bruins
BY
ATTORNEYS

United States Patent Office 2,856,635
Patented Oct. 21, 1958

2,856,635

METHOD OF MANUFACTURING PLASTIC SHEET MATERIAL WITH PEARL ESSENCE INCORPORATED THEREIN

Edward Gerson, Great Neck, and Paul F. Bruins, Douglaston, N. Y., assignors, by direct and mesne assignments, to Patrician Plastic Corp., Paterson, N. J., a corporation of New Jersey Application August 24, 1954, Serial No. 451,804

4 Claims. (Cl. 18—47.5)

This invention relates to a method of making plastic sheet material for the manufacture of imitation-pearl buttons.

It is well known that in order to achieve a maximum pearly effect or luster when pearl essence is incorporated in a plastic, the particles of essence should be so arranged in the plastic that their broad surfaces are parallel to the surface of the plastic and the essence should be uniformly distributed throughout the plastic material. In the past the most common method of making sheets of pearly plastic material was to suspend pearl essence in a liquid commercial resin and to pour or flow the material between two parallel surfaces and to allow the plastic to set in position between said sheets. Such a method has several shortcomings, among which are the slowness of the process and the difficulty of obtaining the desired quality of the product in respect to the proper pearly appearance and luster of the material.

In accordance with the present invention, briefly described, a sheet of cross-linked polyester resin, that is, a resin which is commonly referred to as a thermo-setting resin, having pearl essence incorporated therein is produced by casting an unsaturated polyester resin with the pearl essence uniformly dispersed therein into the form of a cylinder or tube in a centrifugal casting machine, and before the resin is completely set, the cast cylinder is severed along a line parallel to its longitudinal axis and removed from the casting machine, placed on a smooth, flat surface so that it may assume the form of a flat sheet of plastic material. At the time the plastic is removed from the machine it is still sufficiently soft or flaccid so that when the plastic is laid out as a flat sheet, the latter is allowed to set at room temperature until it reaches its final cross-linked condition so that it is stiff or rigid. Further, in accordance with the present invention, the plastic composition from which the sheet is formed includes additional ingredients hereinafter referred to, and certain properties of the composition and other conditions, for example the viscosity of the plastic composition at the time it is introduced into the casting machine and the centrifugal force developed thereon during the casting operation, as hereinafter more particularly described, have been found to contribute to the success of the present invention in the commercial practice thereof.

An important feature of the present invention resides in the preparation of the plastic-pearl essence composition or mix with the incorporation therein of other ingredients, pursuant to this invention, and the casting of said mix in such manner that the nacreous particles of the pearl essence are properly oriented in the plastic so as to produce a maximum pearly luster and concomitantly to avoid the formation of minute grooves or streaks, mottled effects, etc., which would impair the desired high quality of the cross-linked polyester-pearl essence sheet for manufacturing high grade imitation-pearl buttons.

It has been proposed heretofore to produce tubular articles, for example fountain pen barrels, etc., by casting them in a rotary casting machine from a thermo-plastic resin having pearl essence incorporated therein, but so far as we are aware thermo-setting or cross-linked resin material having pearl essence incorporated therein has not heretofore been produced in accordance with that method and as heretofore known, that method cannot be used successfully for producing a cross-linked resin-pearl essence sheet material suitable for the manufacture of high grade imitation-pearl buttons and similar articles.

Another important feature of this invention resides in the incorporation in the plastic-pearl essence mix of an incompatible non-reacting lubricant which renders the set plastic material readily machinable and provides the set plastic with a fine surface finish.

Other advantages, objects and features of this invention will become clear hereinafter as the details of this process are fully described.

Figure 2:
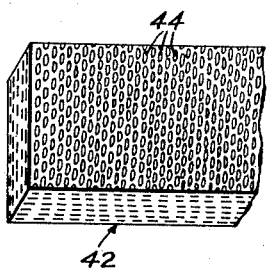

The presently preferred mode of practicing the present invention will now be described in detail with reference to the accompanying illustrative drawings, in which:

Fig. 1 is a perspective view of a centrifugal casting machine utilized in accordance with this invention; and Fig. 2 is a diagrammatic perspective view of a plastic sheet formed by our process.

The plastic material for producing the cross-linked resin-pearl essence composition according to our invention is a commercial non-air inhibited transparent polyester resin. Such a commercial product commonly contains, by weight, approximately 71 percent unsaturated polyester resin, 29 percent styrene and a trace of inhibitor, for instance .05 percent hydroquinone to temporarily prevent, i. e., before use, setting of the resin. While the proportions of polyester resin and styrene mentioned with regard to the commercial polyester resin may vary over a considerable range they should be such as to provide the proper viscosity of the casting composition. We have found that a commercial polyester resin-styrene mixture having a viscosity of approximately 1100 to 1000 centipoises at 35° to 40° C. is satisfactory. To the mass of polyester resin-styrene mixture is added commercial pearl essence which commonly contains approximately 37 percent of solids suspended in a mixture of amylacetate and diallyl phthalate although any other suitable pearl essence may be employed. Preferably the pearl essence employed is of the synthetic type well known in the art although it is within the scope of this invention to use pearl essence produced from fish scales. Also, added to this initial mixture is a catalyst promoter such as cobalt naphthanate (6% metallic cobalt in solution). All that need be added of the catalyst promoter is just a trace, for instance, ¾ to 1½ grams of the solution to 2200 grams of mixture of the resin-pearl essence casting composition. A fourth ingredient of the initial mix is silicone oil, preferably of a viscosity of approximately 350 centistokes at 25° C. The amount of silicone oil to be added is only a trace, i. e., of the order of 4 grams for 2200 grams of the resin-pearl essence composition. The silicone oil being incompatible with the plastic tends to asume the form of a suspension of very small droplets in the composition. We have found that after the plastic has hardened, the silicone oil dispersed therein tends to improve the machineability of the plastic, avoiding chipping and breakage when the blanks are being made or work is being performed upon the blanks to make the buttons therefrom and also tends to yield a better surface on the plastic.

The ingredients may be mixed together at room temperature (70° F. to 75° F.) in any order, and the mixture is preferably heated to about 40° C. and well stirred to uniformly distribute both the essence and the silicone oil throughout the composition.

After the mixture is heated to a temperature of 40° C., a quantity or batch required for one casting operation is removed from the entire mass for further treatment thereon. For the purposes of explanation it will be assumed that the amount necessary for one casting operation is approximately 2200 grams. To the 2200 gram batch heated to 40° C. a catalyst is now added. Any peroxide catalyst such as methyl ethyl ketone peroxide, hydrogen peroxide, and cyclohexyl hydroperoxide may be used. A 50% water solution of hydrogen peroxide is preferred. The major advantage of using the hydrogen peroxide solution as the catalyst is that less catalyst promoter is required. This is desirable in order to prevent the catalyst promoter from coloring the plastic-pearl essence sheet. The quantity of catalyst (50% water solution of $H_2O_2$) added to a 2200 gram batch of the above described mixture is preferably about 15 grams, but 12 to 24 grams may be used instead if so desired. The 2200 gram batch should be maintained at 40° C. and well stirred during the addition of the catalyst and the latter should be added slowly to avoid possible danger of violent spattering.

The following is an example of the preferred plastic mix employed in accordance with this invention for producing the plastic-pearl essence sheet material for manufacturing pearl buttons:

| | Grams |
|---|---|
| Transparent polyester-styrene mixture containing by weight 71% polyester resin and 29% styrene (88% Polylite "8008", Reichhold, and 12% Laminac "4131", American Cyanamid), having a viscosity of 1335 centipoises at 25° C. | 2134.0 |
| Pearl essence (synthetic pearl essence having 37% by weight of solids and 63% amyl acetate and diallyl phthalate) | 66.0 |
| Cobalt naphthanate (6% metallic cobalt in solution) | 1.0 |
| Silicone Oil having a viscosity of 350 centistokes at 25° C. | 4.0 |

While the mix of this example is maintained at 40° C. and constantly stirred and just before the mix is to be introduced into the centrifugal casting machine, 15 grams of a 50% solution of hydrogen peroxide is added to the mix, and the resulting mass is agitated for about three minutes, although an agitation time between two and four-and-a-half minutes may be used, and immediately thereafter the mix is introduced into the casting machine in the manner and under the preferred conditions presently to be described.

The details of the centrifugal casting machine are shown in Fig. 1. The machine 10 includes a base 12 having two upper horizontal spaced supports 14. Mounted on each support 14 are a pair of bearings 16 which are so positioned that corresponding bearings from each pair are in alignment. Journalled in the forward bearings is a rotatable shaft 18 on which are mounted a pair of flanged idler wheels 20. Journalled in the rear bearings is a rotatable shaft 22 on which are fixedly mounted for rotation a pair of flanged drive wheels 24. A pulley wheel 26 is fixedly mounted on one end of shaft 22. Mounted on a supporting structure 28 which is secured to base 12 under pulley wheel 26 is an electric motor 30 having a pulley wheel 32 mounted on its shaft. A belt 31 extends between the two pulley wheels so that when motor 30 is operating, drive wheels 24 will rotate.

Positioned on drive wheels 24 and idler wheels 20 is a drum 34. Drum 34 comprises a central cylindrical portion 36 and two outer flange portions 38 which extend beyond both the inner and outer surfaces of the central cylinder. The portions of flange 38 extending beyond the outer surface of the cylinder engages the idler and drive wheels, the flanged portions of the wheels extending upward along the inner surfaces of the drum flanges in order to prevent any transverse movement of the drum. With the drum so disposed on the idler and drive wheels, it will be seen that when the drive wheels are rotated by operation of the motor, the drum will rotate. The portion of flanges 38 extending beyond the inner surface of the cylinder are provided to prevent the plastic-pearl essence mix 39 from running out of the drum after it has been distributed over the inner surface thereof in a manner to be described presently. The drum 34 may be made out of any suitable material but it has been discovered that excellent results are achieved when the drum is made of aluminum due to that metal's excellent heat conducting characteristic. Furthermore, the inner surface of the drum must be smooth and polished thus obviating or minimizing the possibility of surface scratches appearing on the cast plastic. As currently employed, drum 34 has a diameter of 30 inches and a width between the inner surfaces of flanges 38 of 11½ inches. With such dimensions, it has been found that 2200 grams of mix will yield a sheet approximately one-eighth inch thick. It will be clear that although the machine described heretofore is the form currently being employed in the practice of the present invention, any suitable centrifugal casting machine may be used without departing from the scope of the invention described herein.

Positioned adjacent the top of and on opposite sides of drum 34 are two infra-red lamps 40 which are employed to heat drum 34 when desired. Of course, other heating means may be used.

During the preparation of the mix as heretofore described, the drum 34 is preferably preheated to 40° C. by lamps 40. The preheating operation is usually accomplished with the drum 34 being rotated in order to insure that the temperature of the surface of the drum is relatively uniform.

Prior to the introduction of the mix into the drum, the inner surface of the drum is coated with a suitable mold release agent such as, for instance, silicone grease thinned by a suitable solvent such as carbon tetrachloride or trichloroethylene, etc. Such a silicone grease is readily available on the market being known as a mold release agent. It will be understood that the application of the mold release agent to the drum may precede or follow the preheating of the drum.

Upon completion of the aforementioned three minute agitation period following the introduction into the mix of the hydrogen peroxide, the mix is slowly poured into the drum, the drum being rotated during this operation. It is important that the mix be as uniformly distributed over the surface of the drum as is possible since the plasitc mix is relatively viscous and takes a relatively short time to gelate and hence cannot completely redistribute itself in the event of uneven distribution during the pouring operation.

For the casting operation a drum of the stated diameter is rotated at a speed of approximately 40 revolutions per minute which by reason of the centrifugal force generated at such speed causes the plastic mix to remain in contact with the polished surface of the drum and to effect optimum distribution and arrangement or orientation of the nacreous particles of the pearl essence in the sheet for obtaining an excellent pearl-like appearance and luster throughout the sheet. The orientation of the pearl essence particles throughout the thickness of the sheet assures the provision of the pearl-like appearance and luster of the surface of the sheet following the machining thereof preliminary to the forming of the buttons therefrom. The time the machine is operated for the casting operation is about thirty minutes, although a shorter or longer period of time is operative say from twenty minutes to one hour. Also, the mold is preferably heated, for example, by infra-red electric heating lamps 40, during the rotation for maintaining the operating temperature of 40° C.

At the end of the casting operation, about thirty minutes according to the preferred example, the rotation of the drum is discontinued and the cast cylinder is cut along a transverse line as indicated at L parallel to the axis of rotation of the drum 34 in Fig. 1, and a cast sheet 42 is removed from the machine and when placed on a flat, smooth surface as described above, assumes the flat sheet form illustrated in Fig. 2. At the time of removal of the sheet from the drum, immediately following the end of the casting operation when the rotation of the drum is discontinued, the sheet is not yet completely set but on the contrary is relatively flaccid so that it is capable of bending into the desired flat sheet form. Also, while the sheet is in this condition it may be cut into smaller sheets convenient for storage or shipping purposes. Further, while in this condition before the sheet becomes hard and rigid, the button blanks may be cut therefrom and for this operation a punching die may be utilized, an operation which would not be practical after the final hardening of the sheet upon completion of the setting action of the material.

An important feature of the present invention is the comparatively short time required for setting the plastic mix to such a degree that the nacreous particles 44 of the pearl essence when disposed in their oriented condition for the optimum pearly effect and luster, as may be seen in Fig. 2, is not disturbed by the continuance of the rotation of the drum of the machine for completing the casting operation. The viscosity of the plastic mix and the temperature thereof in the casting operation are factors which contribute to the attainment of this result and by reason of the comparatively slow speed of rotation of the drum, the resultant centrifugal force is such as to cause the particles of pearl essence to be disposed in oriented relation for their optimum effect.

It should also be noted that shortly after the mix is distributed over the surface of the drum in the casting operation to form the cylindrical layer of plastic mix thereon, gelation of said plastic mix takes place to a degree sufficient to greatly minimize or obviate slippage between radially extending increments of said plastic in a direction circumferentially of the drum, and it would also appear that the presence of the film of silicone grease between the polished surface of the drum and the layer of plastic mix contributes to this desired result as a result of which the formation of streaks and lines which impair the desired ornamental appearance of the plastic sheet is obviated.

The commercial polyester resin employed in our process is a non-air inhibited resin in order that the cast sheet 42 will have a tack-free surface. Such a non-air inhibited polyester resin has a material contained therein which is incompatible with the resin and forms a film to protect the resin from the air thereby permitting the plastic to set in the presence of air. However, it will be understood that a polyester resin which is not non-air inhibited may be employed and in order to avoid a tacky surface on the plastic sheet, talcum or corn starch may be spread over the surface thereby keeping it tack-free.

Except as otherwise specified above and in the appended claims, the order of the steps to be performed in the herein described process need not follow any particular sequence.

Although we have herein described the preferred process for making a plastic material with a solid pearl essence uniformly distributed therethrough with the flat surfaces of the essence parallel to the surface of the plastic, and we have further suggested various modifications and changes which may be made in such a process, it will be understood that various other changes and modifications may be made therein within the scope of the appended claims without departing from the spirit and scope of our invention.

Having thus described our invention, what we claim and desire to secure by Letters Patent is:

1. A method of making pearly plastic sheet material, comprising centrifugally casting a plastic mix consisting essentially of a polymeric unsaturated polyester resin, and pearl essence, said resin being polymerizable first to a flaccid condition and thereafter to a rigid condition, and thereby forming a tube of said material with the pearl essence oriented therein for optimum nacreous appearance, terminating the centrifugal casting operation while the tube is in a flaccid condition and before the chemical cross-linking of said resin is completed, and forming a flat sheet of said material from said tube before said chemical cross-linking of said resin is completed, and punching a multiplicity of article blanks from the flat sheet before the chemical cross-linking of the resin is completed.

2. A method of making pearly plastic sheet material, comprising introducing into a drum having an inner cylindrical surface and mounted for rotation about its horizontal axis a plastic mix consisting essentially of a polymeric unsaturated polyester resin and styrene and having pearl essence incorporated therein and including hydrogen peroxide as a catalyzer, said resin being polymerizable first to a flaccid condition and thereafter to a rigid condition rotating said drum until there is formed on said cylindrical surface thereof a layer of said plastic mix which is in partially cross-linked condition and is gelated to a degree such that the plastic layer is flaccid, and removing said plastic layer from said drum while it is still in a flaccid condition, and flattening said layer while it is in a flaccid condition, and punching a multiplicity of article blanks from the flat sheet before the chemical cross-linking of the resin is completed.

3. A method of making pearly plastic sheet material, comprising introducing into a rotating drum having an inner cylindrical surface and mounted for rotation about its horizontal axis a plastic mix consisting essentially of a polymeric unsaturated polyester resin and styrene and having pearl essence incorporated therein and including hydrogen peroxide as a catalyzer, said resin being polymerizable first to a flaccid condition and thereafter to a rigid condition continuing to rotate said drum to form on said surface thereof a cylindrical layer of said plastic in gelated condition, discontinuing the rotation of said drum when said plastic layer attains a degree of gelation at which the plastic is in partially cross-linked condition and the layer is flaccid and removable from the drum without disintegration thereof, and removing the plastic layer from the drum while said layer is in such flaccid condition, and punching a multiplicity of article blanks from the flat sheet before the chemical cross-linking of the resin is completed.

4. A method of making pearly plastic sheet material, comprising centrifugally casting a plastic mix consisting essentially of a polymeric unsaturated polyester resin, and pearl essence and containing a catalyst and a catalyst promoter, said resin being polymerizable first to a flaccid condition and thereafter to a rigid condition, and thereby forming a tube of said material with the pearl essence oriented therein for optimum nacreous appearance, terminating the centrifugal casting operation while the tube is in a flaccid condition and before the chemical cross-linking of said resin is completed, and forming a flat sheet of said material from said tube before said chemical cross-linking of said resin is completed, and punching a multiplicity of article blanks from the flat sheet before the chemical cross-linking of the resin is completed.

References Cited in the file of this patent

UNITED STATES PATENTS

| | | |
|---|---|---|
| 2,045,471 | Kasen | June 23, 1936 |
| 2,265,226 | Clewell et al. | Dec. 9, 1941 |
| 2,379,248 | Muskat | June 26, 1945 |
| 2,473,801 | Kropa | June 21, 1949 |
| 2,593,827 | Anspon et al. | Apr. 22, 1952 |
| 2,652,597 | Sucher | Sept. 22, 1953 |
| 2,655,489 | Lawson | Oct. 13, 1953 |
| 2,659,107 | De Bell | Nov. 17, 1953 |

OTHER REFERENCES

"Die Lubricants: the Silicones," D. M. Francisco and R. S. Naegel, Precision Metal Molding Magazine, May 1953, 260–29.1 Si.